United States Patent Office 3,228,991
Patented Jan. 11, 1966

1

3,228,991
PROCESS AND CATALYST FOR THE PREPARATION OF METHYL-1,3-CYCLOPENTADIENE
Clarence L. Dulaney, Texas City, Tex., and Raymond A. Franz, Kirkwood, Mo., assignors to Monsanto Company, St. Louis, Mo., a corporation of Delaware
No Drawing. Filed Mar. 8, 1962, Ser. No. 178,273
9 Claims. (Cl. 260—666)

This application is a continuation-in-part of application Serial Nos. 821,713 and 821,714 both filed June 22, 1959, both of which are now abandoned.

This invention relates to a novel catalyst and to the use of this catalyst in the catalytic dehydrogenation of methylcyclopentane to produce methyl-1,3-cyclopentadiene.

Throughout the specifications and claims of this application methyl-1,3-cyclopentadiene is used generically to encompass all positional isomers as determined by the position of the methyl group on the cyclopentadiene ring. The invention disclosed and claimed in this application is applicable to all such isomers.

Methyl-1,3-cyclopentadiene is an extremely useful compound. It has utility as a biological toxicant and in the preparation of intermediates useful in synthetic resinous compositions. To date, a commercially satisfactory process for the synthesis of methyl-1,3-cyclopentadiene has not been discovered or disclosed and this has hampered the full utilization of this material.

It is an object of this invention to provide an improved process for the production of methyl-1,3-cyclopentadiene. It is a particular object of this invention to provide a process for the production of methyl-1,3-cyclopentadiene by the catalytic dehydrogenation of methylcyclopentane. It is a still further object of this invention to provide a new and improved catalyst. A further object of the present invention is to provide a method of preparation for a new and improved catalyst. Another object of this invention is to provide a new and improved catalyst for the dehydrogenation of methylcyclopentane to methyl-1,3-cyclopentadiene. Yet, another object of the present invention is to provide a method for the preparation of a new and improved catalyst for the dehydrogenation of methylcyclopentane to methyl-1,3-cyclopentadiene. Additional objects will become apparent from the description of this invention.

In fulfillment of these and other objects, it has been found that methyl-1,3-cyclopentadiene is produced in good yields by intimately contacting methylcyclopentane at an elevated temperature with a catalyst comprising an inert, non-acidic, high surface area carrier impregnated with from about 0.05 to about 5% by weight of total composition of a mixture of platinum and copper containing copper in the amount of from about 1 to 90% by weight of the mixture, said mixture having been prepared by impregnating said carrier with platinum and copper compounds readily reducible or decomposable to metallic platinum and copper and which upon decomposition to the metal leave no residual ions other than the metallic ions.

One of the most critical features of the present invention is the method of preparation of the catalyst. The compounds which must be used for impregnating the carrier are those which are completely decomposable

2 to metallic copper and platinum and which leave no residual ions, i.e., ions derived from the copper and platinum compounds, after drying and reduction other than metallic copper and platinum. Catalysts having copper and platinum supported on carriers are known to the prior art. Examples of such catalysts are disclosed by Myers et al. in U.S. Patent 2,911,357. However, in using such catalysts in the present process, it is found that they are much too severe in their action to bring about dehydrogenation of methylcyclopentane to methyl-1,3-cyclopentadiene. This is found to be the result of residual ions other than platinum and copper, such as chlorine and other acidic ions derived frmo the copper and platinum compounds remaining in the catalyst after completion of drying and reduction. It has now been found that the exclusion of such acidic residual ions from the finished catalyst produces a catalyst capable of such mild dehydrogenation as that disclosed herein with a high degree of efficiency.

Several platinum and copper compounds have been found effective in preparing the catalyst used in the present invention. Among the platinum and copper compounds which have been found to be reducible or decomposable to metallic platinum and copper, thereby forming a catalyst free of residual ions other than copper and platinum are platinum diaminodinitrite, platinous tetraminohydroxide, platinous dihydroxydiamine, copper nitrate, copper acetate, copper formate and copper lactate. Of these, the most preferred are platinum diaminodinitrite and copper nitrate. It is to be understood, of course, that these are not the only compounds containing platinum and copper which may be used in the practice of the present invention, but represent only those which are more preferred and practical.

The following examples illustrate the preparation of the novel catalyst disclosed herein and the process whereby this catalyst is utilized in dehydrogenation reactions.

EXAMPLE I

Copper nitrate (0.288 g.) containing 3 mols of water of crystallization and 0.032 g. of platinum diaminodinitrite were added to 50 ml. of concentrated ammonium hydroxide and the resultant solution poured over 100 ml. of $SiO_2$ pellets in a suitable container. The mixture was digested for two to three hours at about 80° C. after which time the temperature was then raised to 200° C. for another two to three hours. The dried catalyst was then calcined for two hours at a temperature of 400° to 600° C. The catalyst was then reduced by passing hydrogen through the catalyst bed at a temperature of about 500° C. for a period of one hour. The catalyst contained 0.2% copper and 0.05% platinum, percentages being by weight of total composition.

EXAMPLE II

Procedure set forth in Example I is repeated using alumina pellets in place of the silica pellets. A catalyst having the same copper and platinum content as that of Example I is obtained.

EXAMPLE III

Copper acetate (1.54 g.) and 0.0925 g. of platinous tetramino-hydroxide are added to 100 ml. of concentrated ammonium hydroxide and the resultant solution is poured over 100 ml. of silica pellets in a suitable container. The mixture is digested for two to three hours at about 80° C. after which time the temperature is raised to 200° C. for another two to three hours. The dried catalyst is then calcined for two hours at a temperature of 400 to 600° C. The catalyst is then reduced by passing hydrogen through the catalyst bed at a temperature of about 500° C. for a period of one hour. The catalyst contains 0.9% of copper and 0.1% of platinum, percentages being by weight of total composition.

Any inert, non-acidic, high surface area carrier can be used to prepare the novel catalyst of this invention. The carrier should have a surface area of at least 100 m.$^2$/g. There is no critical upper limit on the area and it can be as high as 1000 m.$^2$/g. or higher if desired. The most critical feature of the carrier is that it be one which is non-acidic or of negligible acidity. By negligible acidity is meant that the acidity is of such small degree as to have no effect on the reaction. Among the preferred carriers having such properties are silica, alumina, and silica-alumina.

In the present invention, acidity of the catalyst is a very critical feature. The catalyst must be completely non-acidic or of negligible acidity. To prepare the non-acidic catalyst of the present invention, it is necessary that the platinum and copper containing compounds from which these metals are obtained, as well as the solvent therefor, be thermally decomposable or reducible to metallic platinum and copper only and leave no residual ions other than the metallic ions. Otherwise, the procedure for preparing the catalyst of the present invention follows conventional methods of impregnation, drying, calcination, and reduction. The support may be simultaneously impregnated with copper and platinum compounds, as illustrated by Example I, and then dried, calcined, and reduced. It is not necessary, however, that this procedure be followed as the carrier may be impregnated first with either of the two metals followed by drying, calcination, and reduction and then impregnated with the other metal followed by drying, calcination and reduction. It will not, of course, be necessary in most instances to reduce the catalyst between impregnations when the two metals are placed upon the carrier separately. In many instances, however, it will be desirable to do so. Though not limiting, drying temperatures will generally range within 50 to 250° C. Calcination temperatures will generally range between 400 and 600° C. Reduction is carried out at conventional reduction temperatures though preferably within the range of from about 450 to about 550° C.

The novel catalyst of this invention has a wide variety of uses. It can be used, for example, in the hydrogenation of 3-hydroperoxy-cyclohexene to produce 3-hydroxy-cyclohexene using conventional hydrogenation techniques. The novel catalyst of this invention is particularly useful in the dehydrogenation of methylcyclopentane to methyl-1,3-cyclopentadiene. According to this process, methylcyclopentane is brought into intimate contact with the catalyst at an elevated temperature to produce a reaction product containing substantial quantities of methyl-1,3-cyclopentadiene which is then recovered. This process is illustrated in the following Example IV.

EXAMPLE IV

A reactor was charged with the catalyst prepared in Example I. A mixture comprising 2.64 mols of methylcyclopentane and 1 mol of hydrogen was fed into the reactor at a liquid hourly space velocity of 1.58. Reactor temperature was maintained at 545° C. A liquid reaction product was obtained containing 3.4% $C_6$ hydrocarbons, 69.5% methylcyclopentane, 8.5% methylcyclopentene, 18.6% methyl-1,3-cyclopentadiene and a trace of benzene, all percentages being expressed by weight of total composition.

Methyl-1,3-cyclopentadiene is recovered from such a reaction mixture by any technique well-known by those skilled in the art. A particularly convenient method comprises heating the reaction mixture obtained for two hours at 70° C. in order to dimerize the methyl-1,3-cyclopentadiene. The other components of the reaction mixture are then separated from the reaction mixture by distillation at a temperature up to 170° C. After the other components have been removed, the reaction mixture is then heated to a temperature of about 170° C. at which point the dimer reverts back to the monomer and methyl-1,3-cyclopentadiene distills over and is recovered.

The reaction temperature used in the dehydrogenation of methylcyclopentane to methyl-1,3-cyclopentadiene can be varied substantially. Temperatures ranging from 400° C. to 600° C. can be used and temperatures ranging from 500° C. to 550° C. are particularly preferred.

The process can be carried out either in the presence or absence of an inert diluent. Hydrogen is a particularly preferred diluent and the quantity of this diluent employed can be substantially varied. Up to 5 mols of hydrogen per mol of methylcyclopentane can be used with from 0.25 mol of hydrogen per mol of methylcyclopentane being preferred. Other inert diluents that can be used include methane, nitrogen, steam, helium and argon.

After the reaction is complete methyl-1,3-cyclopentadiene is recovered from the reaction mixture by any technique well-known to those skilled in the art. The novel process of this invention is particularly noteworthy because of its relatively high, single pass conversion of methylcyclopentane to methyl-1,3-cyclopentadiene and the substantial lack of any production of benzene, a difficulty experienced in prior art processes.

What is claimed is:

1. A process for producing methyl-1,3-cyclopentadiene which comprises intimately contacting methylcyclopentane at an elevated temperature of from about 400 to about 600° C. with a catalyst comprising an inert, non-acidic, high surface area carrier selected from the group consisting of silica, alumina, and silica-alumina, impregnated with from about 0.05 to about 5% by weight of total composition of a mixture of platinum and copper containing copper in the amount of from about 1 to 90% by weight of said mixture, said mixture having been prepared by impregnating said carrier with platinum and copper compounds reducible to metallic platinum and copper, and which upon decomposition to the metal leave no residual ions other than the metallic ions.

2. The process of claim 1 wherein the carrier has a surface area greater than 100 m.$^2$/g.

3. The process of claim 2 wherein the carrier is silica.

4. The process of claim 2 wherein the carrier is alumina.

5. The process of claim 2 wherein the carrier is silica-alumina.

6. The process of claim 1 wherein the catalytic mixture is prepared by impregnating the base support with a platinum compound selected from the group consisting of platinum diaminodinitrite, platinous tetraminohydroxide, and platinous dihydroxydiamine.

7. The process of claim 1 wherein the copper mixture is prepared by impregnating the base support with a copper compound selected from the group consisting of copper nitrate, copper acetate, copper formate and copper lactate.

8. The process of claim 1 wherein the reaction process is carried out in the presence of an inert diluent.

9. A process for producing methyl-1,3-cyclopentadiene which comprises intimately contacting methylcyclopentane at an elevated temperature of from about 400° to about 600° C., with a catalyst comprising an inert, non-acidic, high surface carrier selected from the group consisting of silica, alumina, and silica-alumina, impregnated with from about 0.05 to about 5% by weight of total composition of a mixture of platinum and copper containing copper in the amount of from about 1 to 90% by weight of said mixture, said mixture having been prepared by impregnating said carrier with platinum diaminodinitrite and copper nitrate.

References Cited by the Examiner

UNITED STATES PATENTS

| | | | |
|---|---|---|---|
| 2,765,355 | 10/1956 | Nozaki | 260—666 |
| 2,911,357 | 11/1959 | Myers et al. | 252—466 X |
| 2,917,466 | 12/1959 | Tamele et al. | 252—460 |
| 2,927,141 | 3/1960 | Cohn et al. | 260—677 |
| 2,939,847 | 6/1960 | Smith et al. | 252—460 |
| 2,967,835 | 1/1961 | Hort | 252—466 X |
| 3,076,858 | 2/1963 | Frevel et al. | 260—677 |

OTHER REFERENCES

Catalysis by S. Berkman et al.: p. 892. Reinhold Publishing Corp., New York, 1940.

DELBERT E. GANTZ, *Primary Examiner.*

ALPHONSO D. SULLIVAN, *Examiner.*